United States Patent [19]

Csanady, Jr. et al.

[11] 3,759,347

[45] Sept. 18, 1973

[54] LUBRICATION SYSTEM

[75] Inventors: Michael Csanady, Jr., Ridley Park; Joseph Sloan, Media; Cornelius S. Goldsborough, Jr., Glen-Riddle, all of Pa.

[73] Assignee: Westinghouse Electric Corporation, Pittsburgh, Pa.

[22] Filed: Jan. 18, 1972

[21] Appl. No.: 218,673

[52] U.S. Cl. ............................. 184/6 R, 184/104 R
[51] Int. Cl. ............................................. F01m 5/00
[58] Field of Search ...................... 184/104 R, 6.28, 184/6 R, 6.27, 55 A

[56] References Cited
UNITED STATES PATENTS

| | | | |
|---|---|---|---|
| 3,261,426 | 7/1966 | Kuhlman | 184/55 A |
| 3,623,573 | 11/1971 | Csanady, Jr. et al. | 184/6 R |
| 3,503,469 | 3/1970 | Renz et al. | 184/6 R |

*Primary Examiner*—Manuel A. Antonakas
*Attorney*—A. T. Stratton et al.

[57] ABSTRACT

A lubrication system for a machine having bearings rotatably supporting a journal such as a turbo-generator unit. The system comprises an oversized cylindrical pipe, hereinafter defined as the guard pipe, in which the pressurized lubricant conduits are housed. The guard pipe is of sufficient size to contain the needed lubricant for the bearings of the turbo-generator unit and thereby eliminate the reservoir.

8 Claims, 4 Drawing Figures

Patented Sept. 18, 1973

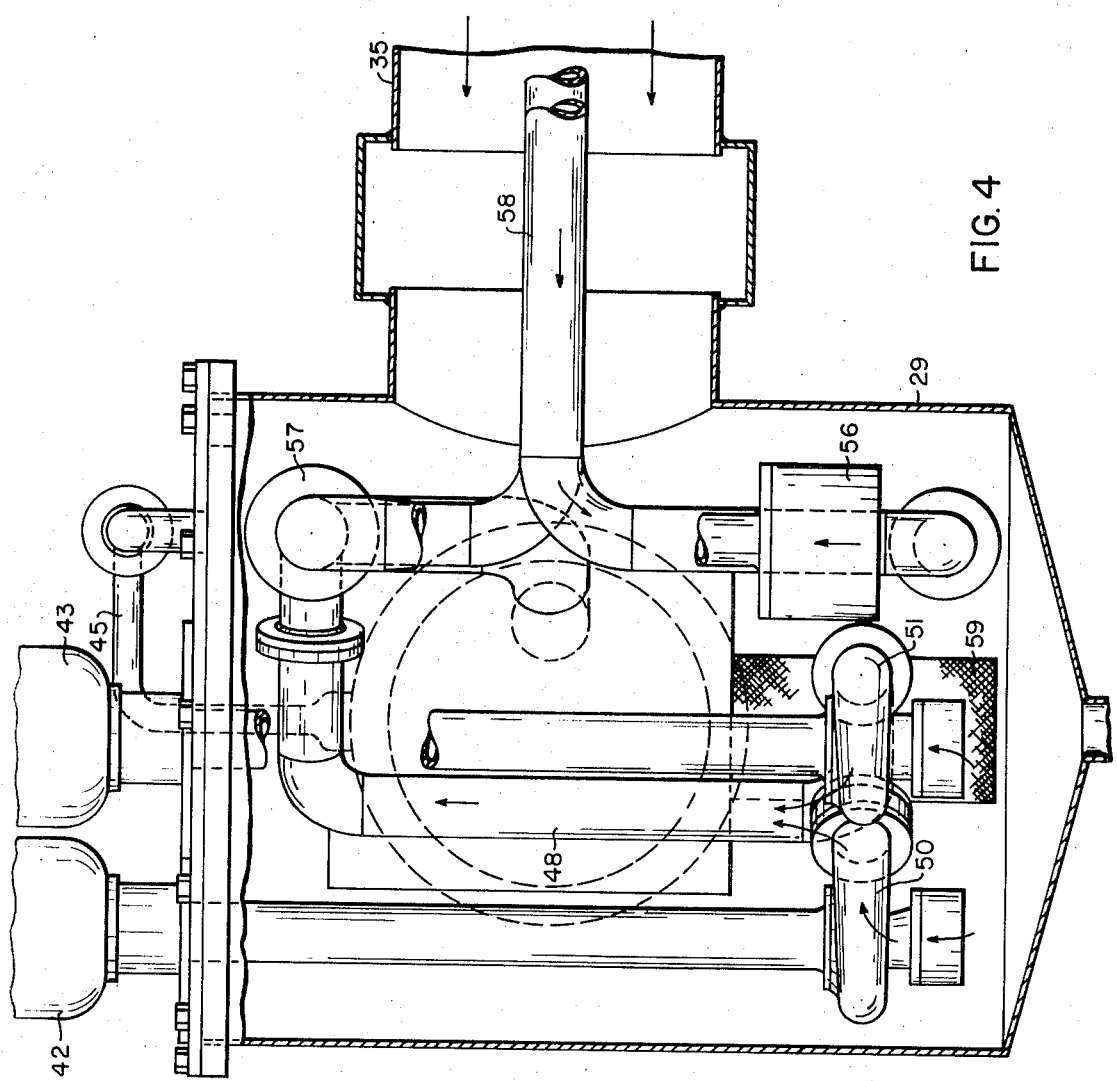

LUBRICATION SYSTEM

BACKGROUND OF THE INVENTION

This invention relates to a lubrication system for supplying lubricant to a machine having bearings rotatably supporting a journal, such as turbo-generator unit. A system of this type is shown in Csanady & Kramer application Ser. No. 12,706, filed Feb. 19, 1970, now U.S. Pat. No. 3,623,573 and assigned to the present assignee.

In large tubo-generator units, a large quantity of lubricant is needed to properly lubricate the bearings. This creates the necessity for a large reservoir to contain the lubricant. Turbo-generator units are consistently being increased in size requiring more and more lubricant and thus the necessity for larger reservoirs. Furthermore, an additional re-inforced foundation is needed to support the reservoir and the lubricant. This requires an additional expenditure for surface land on which to place the reservoir and an additional expenditure for the actual reservoir. Finally, since the reservoir is, by necessity, separated from the turbo-generator units, large conduits are necessary to transport the lubricant from the reservoir to the bearings. This required an additional amount of lubricant to be added to the reservoir initially, i.e. in a turbo-generator unit requiring a 10,000 gallon lubricant capacity to supply oil to the bearings, over 14,000 gallons of lubricant are necessary to be initially charged in the system. Also, because of the size and weight of the reservoir, it is commonly put on the ground floor of the turbo-generator unit and large pumping means are necessary to raise the oil from the lubricant on the ground floor to the turbo-generator bearings.

It would be desirable then to design a lubrication system that would eliminate the need for a large reservoir. It would further be desirable to be able to minimize the additional lubricant initially added to the lubrication system. Finally, it would be desirable to design a lubrication system which would reduce the size of the pumping means necessary to supply the lubricant to the bearings.

SUMMARY

This invention relates to a lubrication system for supplying lubricant to a machine having bearings rotatably supporting a journal such as a turbo-generator unit and more specifically to a system adapted to hold a specific quantity of lubricant necessary to lubricate the machine without the necessity of a reservoir.

Turbo-generator units are generally mounted on a foundation. Half of the unit extends from the upper floor level and the other half is below the upper floor level. The upper floor level is supported by bulk heads which are secured to a lower floor level.

In accordance with the principles of the present invention the lubrication system comprises an inner and outer conduit structure mounted approximately at the centerline of the turbo-generator unit. The outer conduit structure is "oversized," or enlarged when compared to outer conduits presently being used, to contain the necessary quantity of lubricant. Thus the oversized outer conduit structure functions as the lubricant reservoir.

The outer conduit structure is comprised of two guard portions connected by a tubular connecting portion. The tubular connecting portion includes an open top portion to receive the pumping structures, a body portion defining a sump portion and which receives the two guard portions. The tubular connecting portion is arranged and secured to the foundation at a corner of the foundation, one guard portion projecting horizontally along the length of the turbo-generator unit and the other projecting at right angles in a horizontal direction along the width of the unit.

The advantages of such a lubrication system are that the initial charge of lubricant necessary to supply the system is greatly reduced, since most of the lubricant is contained in the outer conduit structure which is relatively close to the turbo-generator unit. There is a substantial saving in space and money in eliminating the actual lubricant reservoir. Finally, the lubrication system is mounted at approximately the same height as the centerline of the turbo-generator units and of their respective bearings so that the size of the pumping means is substantially reduced.

DESCRIPTION OF THE DRAWINGS

FIG. 4 is an enlarged side view partly in section of the system shown in FIG. 1.

DESCRIPTION OF THE PREFERRED EMBODIMENT

Figure 1:
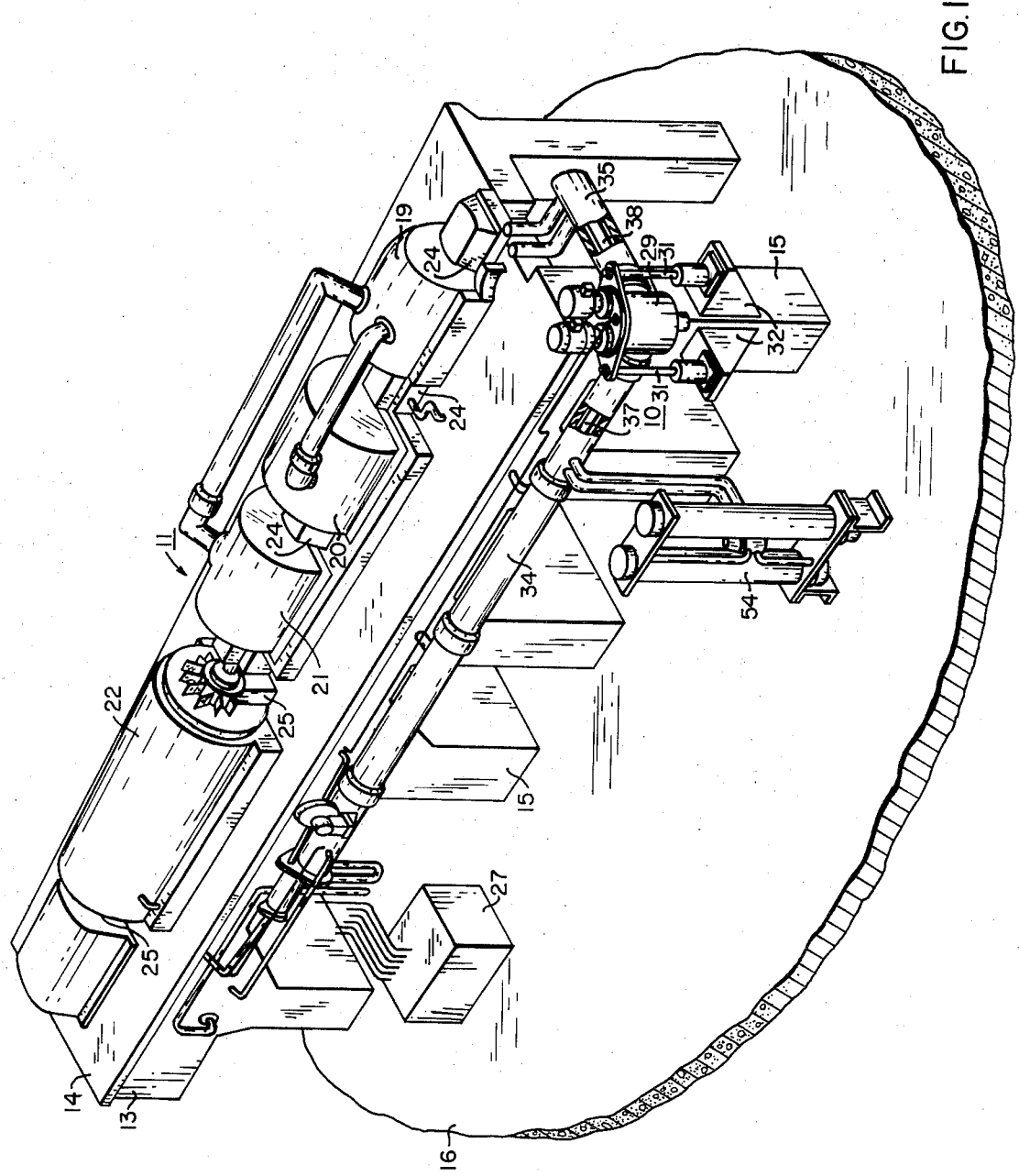
FIG. 1 is a view in perspective of a turbo-generator unit having a lubrication system formed in accordance with the present invention.

Referring to the drawings in detail and particularly to FIG. 1, there is shown a lubrication system 10 for a turbo-generator unit 11, which is a typical environment for the lubrication system. The turbo-generator unit 11 is mounted on a reinforced concrete foundation 13 having an upper floor level 14, supported by a plurality of horizontally-spaced and vertically-extending bulkheads 15, and a lower floor level 16. The turbo-generator unit 11, as shown, is comprised of a high pressure steam turbine unit 19 and two low pressure steam turbine units 20 and 21. The turbine units 19, 20 and 21 are in driving connection with an electric generator 22 which produces electricity for consumption.

The lubrication system 10 supplies oil to the steam turbine units 19, 20 and 21 and the generator 19 at bearings 24 and 25, respectively. The lubrication system 10 may also supply oil to the other accessories such as the hydraulic controls (not shown) and the hydrogen seal oil unit 27, which provides oil for the gland seals for the hydrogen in the generator 22, as is well known in the art.

The lubrication system 10 comprises a sump portion 29 which is mounted at a corner of one of the bulkheads 15, by any suitable means such as fastening structures 31. The structures 31 are in turn supported from protuding members 32, which may be formed integral with the bulkhead 15. The sump 29 is positioned at approximately the vertical center line of the turbo-generator unit 11.

The lubrication system 10 also includes outer conduit structures 34 and 35 which are mounted slightly below the upper floor level 14 and at approximately the vertical center line of the turbo-generator unit 11. The outer conduit structures 34 and 35 are at substantially right angles to each other and are fluidly connected by the sump 29, which functions as a tubular connecting portion.

Disposed within each of the outer conduits 34 and 35 are smaller diameter inner conduits 37 nd 38, respectively, which supply pressurized lubricant to the bearings and main oil pump suction.

Figure 2:
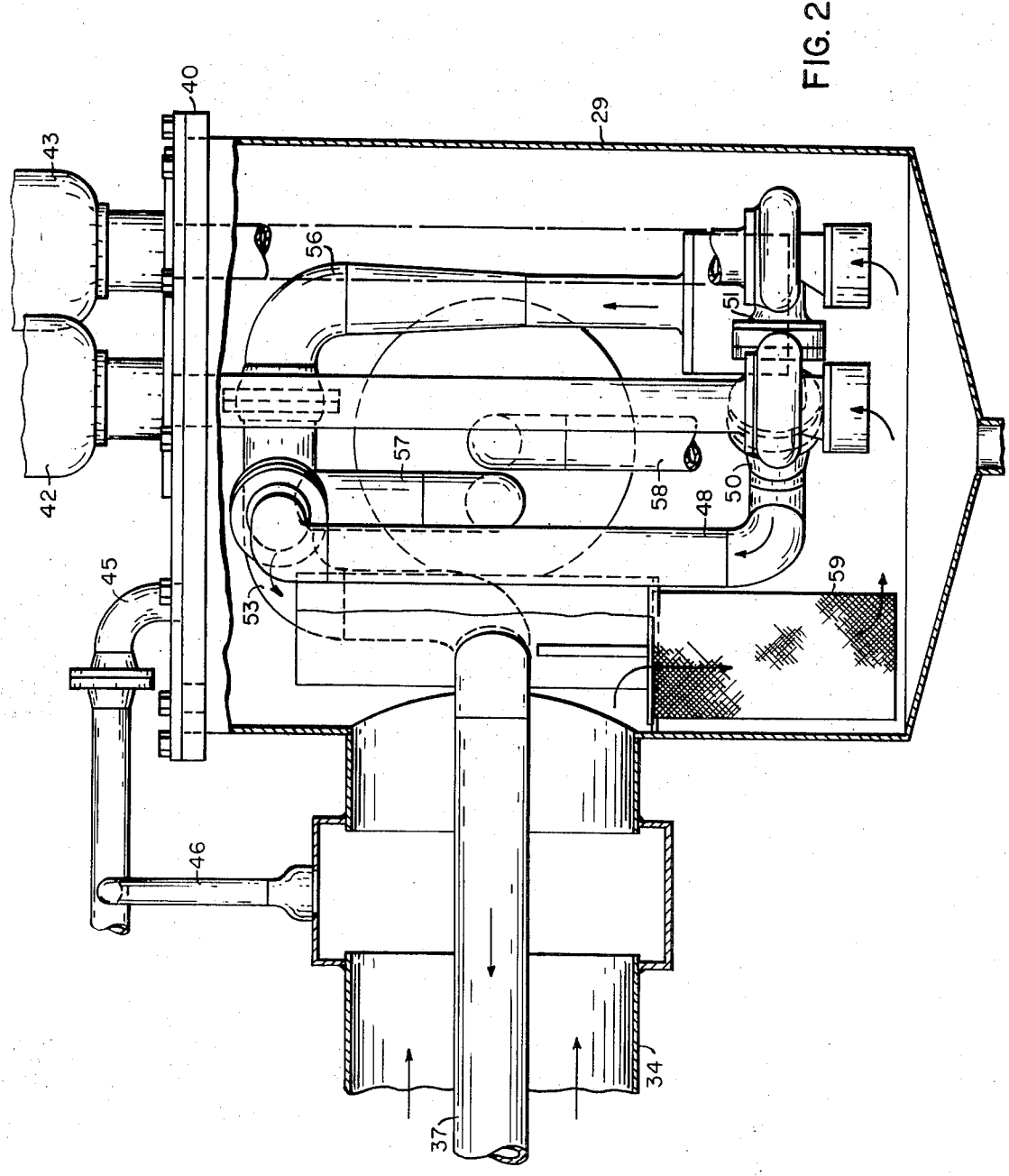
FIG. 2 is an enlarged front view partly in section of a portion of the lubrication system shown in FIG. 1.

As best seen in FIG. 2, the sump 29 is open at the top and has a closing plate structure 40 secured thereto. Directly mounted to the closing plate 40 is an AC operated pump 42 and a DC operated back-up pump 43. A vapor extractor conduit 45 is secured to the plate 40 and is in communication with the sump. The vapor conduit 45 is also in communication with the outer guard-pipe conduit 34 via conduit 46.

Figure 3:
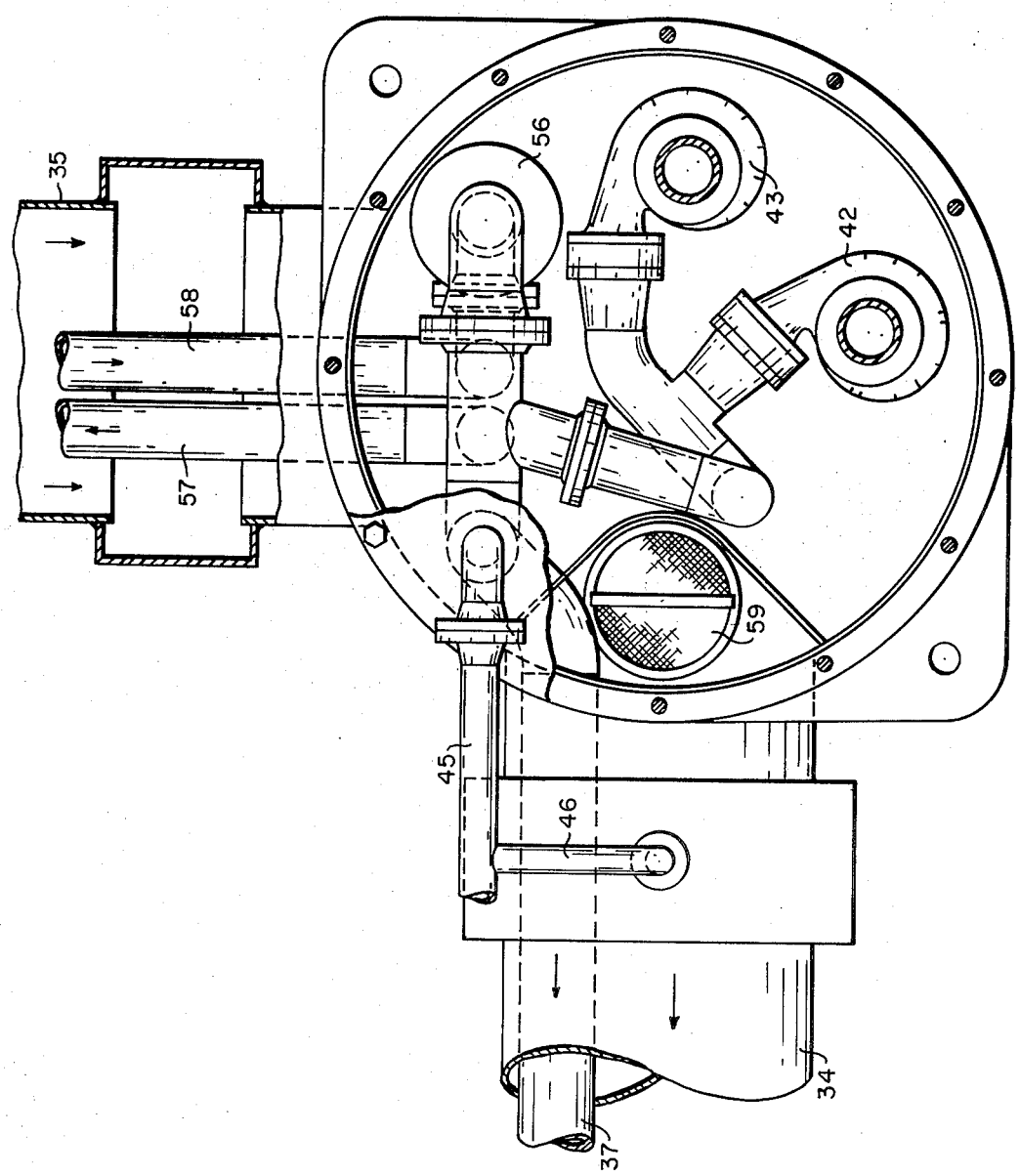
FIG. 3 is an enlarged plan view partly in section of a portion of the lubrication system shown in FIG. 1.

As best seen in FIGS. 2–4, conduit 48 is fluidly connected to the corresponding discharge nozzle portions 50 and 51 of AC pump 42 and DC pump 43, respectively. Conduit 48 is fluidly connected to a common manifold 53, which in turn is fluidly connected to pressurized conduit 37. The conduit 37 directs the lubricant to the double cooler structure 54, as best shown in FIG. 1.

An oil ejector structure 56 discharges oil to a main oil pump (not shown), the pump being disposed on the shaft of the turbine. The lubricant flows to the main oil pump from the ejector 56 through the manifold 57 and the bearing oil conduit 37. Pressurized oil from the main oil pump returns to the ejector 56, via a main oil pump discharge conduit 58.

An oil strainer 59 is disposed on the bottom portion of the sump 29 so that the oil draining into the sump from either the outer conduit 34 or 35 is filtered before being pumped by pump 42 and 43. The outer conduits 34 and 35 serve a multiple function: (1) they serve as a return duct for the lubricant draining from the bearings 24 and 25; (2) the outer conduits 34 and 35 serve as a guard pipe to protect against leakage from the pressurized conduits 37 and 38; and (3) the outer conduits function as a reservoir to contain most of the lubricant and thereby eliminate the conventional oil reservoir.

AC oil pump 42 or the DC oil pump 43 discharge oil through the convoluted discharge portion 50 or 51, respectively, and through conduit 48 as indicated by the arrows. A portion of the lubricant flows through the manifold 53 and then through the conduit 37 to the coolers 54 (FIG. 1). From the coolers 54 the oil flows to the bearings 24 and 25 and through the conduit 57 to the suction of the main oil pump.

The oil from the main oil pump (not shown), which is located on the turbine shaft, returns through the main oil pump discharge conduit 58 to the oil ejector 56 wherein the high velocity oil flowing therethrough creates a vacuum to increase the quantity of oil in conduit 57 which supplies oil to the suction of the main oil pump and via conduit 37 to the oil cooler 54 and then to the bearings 24 and 25.

The oil from the turbo-generator bearings 24 and 25 (FIG. 1) drains into the outer conduits 34 and 35 as indicated by the arrows. The oil flowing from the conduits 34 and 35 flows through the strainer 59 and then into the sump 29.

As can be seen, the initial charge or the initial amount of lubricant necessary to supply the system with lubrication is greatly reduced when compared to present lubrication systems. Most of the lubricant is contained in the outer conduit structure which is relatively close to the turbo-generator unit. There is a substantial savings in space and money in eliminating the actual lubricant reservoir. Since the system is mounted at approximately the same height as the axis of the turbo-generator unit and their respective bearings, the size of the pumping equipment is substantially reduced. Although one embodiment is shown, it will be obvious to those skilled in the art that it is not so limited but is susceptible to various changes without departing from the spirit thereof.

We claim:

1. A lubrication system comprising a machine having a support structure and bearings rotatably supporting journal portions of said machine, conduit structures mounted on said support and pumping means, said pumping means being fluidly connected to said conduit structures, said conduit structures and pumping means being cooperatively associated to supply lubricant to said bearings, said conduit structures comprising at least one oversized outer conduit structure in fluid communication with said bearings and so disposed with respect thereto, to provide a return duct for said lubricant, and at least one pressurized supply conduit disposed to supply lubricant to said bearings, said conduit structures being adapted to contain a predetermined quantity of lubricant corresponding to the lubrication demand of said machine.

2. The system according to claim 1, wherein said outer conduit structure comprises two guard portions and a tubular connecting portion, said guard portions being connected to each other and in fluid communication with each other through the tubular connecting portion.

3. The system according to claim 2, wherein said tubular connecting portion comprises an open top portion, and a main body portion defining a sump, a top plate structure to which the pumping means is secured, and said top plate being secured to the body portion to close said open portion.

4. The system ccording to claim 1 and further including filtering means and lubricant cooling means.

5. The system according to claim 1, wherein said conduit structures are mounted to the support for the machine at approximately the horizontal axis of the machine.

6. The structure recited in claim 1, wherein the outer conduit structure encompasses the pressurized supply conduit structure to protect against high pressure leaks from the supply conduit structure.

7. The structure recited in claim 2, wherein the tubular connecting portion is secured at a corner of the machine support, one guard portion projecting horizontally along the length of the machine and the other projecting at right angles in a horizontal direction along the width of the machine.

8. The structure recited in claim 1, wherein said machine comprises an elastic fluid axial flow utilizing machine.

* * * * *